(12) United States Patent
Sun et al.

(10) Patent No.: US 12,556,184 B2
(45) Date of Patent: Feb. 17, 2026

(54) ERASABLE PROGRAMMABLE NON-VOLATILE MEMORY CELL

(71) Applicant: eMemory Technology Inc., Hsin-Chu (TW)

(72) Inventors: Wein-Town Sun, Hsinchu County (TW); Woan-Yun Hsiao, Hsinchu County (TW); Wei-Ren Chen, Hsinchu County (TW); Hsueh-Wei Chen, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 435 days.

(21) Appl. No.: 18/190,272

(22) Filed: Mar. 27, 2023

(65) Prior Publication Data

US 2023/0328978 A1 Oct. 12, 2023

Related U.S. Application Data

(60) Provisional application No. 63/329,491, filed on Apr. 11, 2022.

(51) Int. Cl.
| | |
|---|---|
| *H03K 19/0185* | (2006.01) |
| *G11C 16/14* | (2006.01) |
| *G11C 16/26* | (2006.01) |
| *H03K 3/037* | (2006.01) |
| *H10B 41/10* | (2023.01) |
| *H10B 41/35* | (2023.01) |

(52) U.S. Cl.
CPC ..... *H03K 19/018521* (2013.01); *G11C 16/14* (2013.01); *G11C 16/26* (2013.01); *H03K 3/037* (2013.01); *H10B 41/10* (2023.02); *H10B 41/35* (2023.02)

(58) Field of Classification Search
CPC .......... H03K 19/018521; H03K 3/037; G11C 16/14; G11C 16/26; H10B 41/10; H10B 41/35; H02M 3/158; H02M 3/1582
See application file for complete search history.

(56) References Cited

U.S. PATENT DOCUMENTS

| | | | |
|---|---|---|---|
| 5,242,848 A | 9/1993 | Yeh | |
| 2007/0120173 A1* | 5/2007 | Lojek | H10B 69/00 257/315 |
| 2013/0163129 A1* | 6/2013 | Lai | H02H 9/044 361/56 |

(Continued)

*Primary Examiner* — William B Partridge
*Assistant Examiner* — David Paul Sedorook
(74) *Attorney, Agent, or Firm* — WPAT, PC

(57) ABSTRACT

A non-volatile memory cell includes a p-type well region, a first n-type doped region, a second n-type doped region, a first gate structure, a second gate structure, a third gate structure and a protecting layer. The first n-type doped region and the second n-type doped region are formed under a surface of the p-type well region. The first gate structure and the second gate structure are formed over the surface of the p-type well region and arranged between the first n-type doped region and the second n-type doped region. A first part of a first gate layer of the first gate structure and the second gate structure are covered by the protecting layer. The third gate structure is formed over the surface of the p-type well region and arranged between the first gate structure and the second gate structure.

27 Claims, 6 Drawing Sheets

(56) References Cited

U.S. PATENT DOCUMENTS

| | | | |
|---|---|---|---|
| 2013/0241026 A1* | 9/2013 | Or-Bach | H10D 86/215 |
| | | | 257/506 |
| 2014/0117437 A1* | 5/2014 | Willmeroth | H10D 62/127 |
| | | | 257/329 |
| 2016/0104537 A1* | 4/2016 | Chang | G11C 16/10 |
| | | | 365/185.29 |
| 2017/0207228 A1* | 7/2017 | Chen | G11C 16/12 |
| 2021/0013300 A1* | 1/2021 | Lin | H10D 84/0158 |
| 2021/0217865 A1* | 7/2021 | Cai | H10D 30/024 |

* cited by examiner

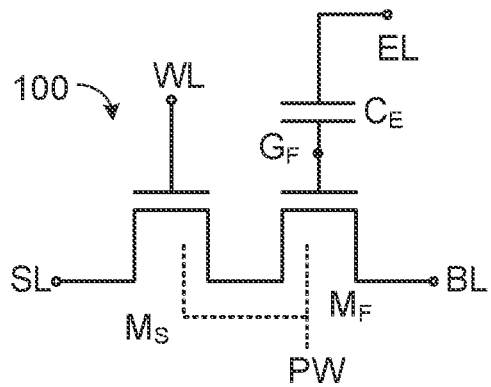
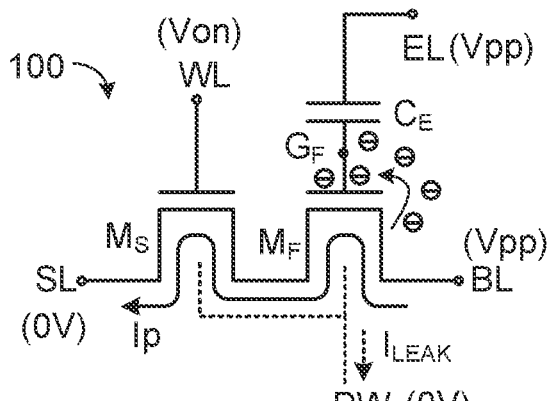
FIG. 1A (PRIOR ART)
FIG. 1B (PRIOR ART)
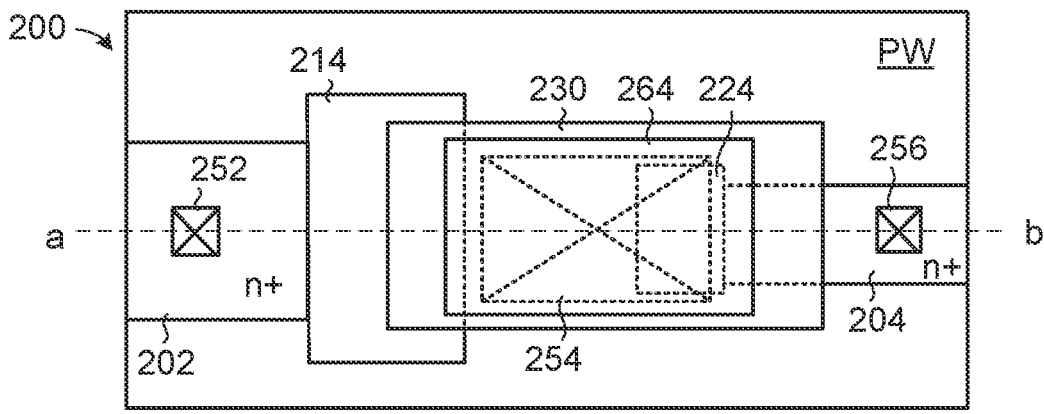
FIG. 2A
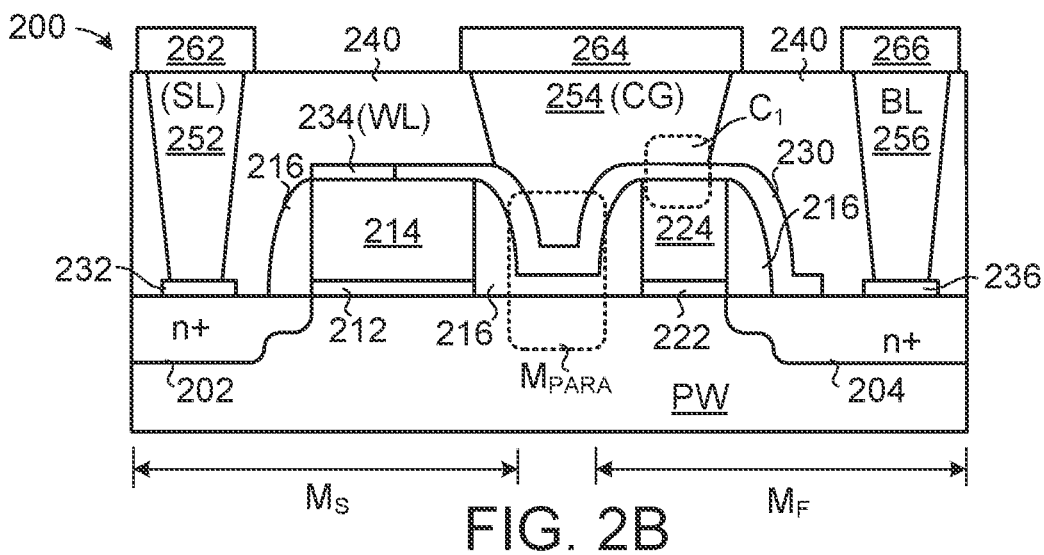
FIG. 2B

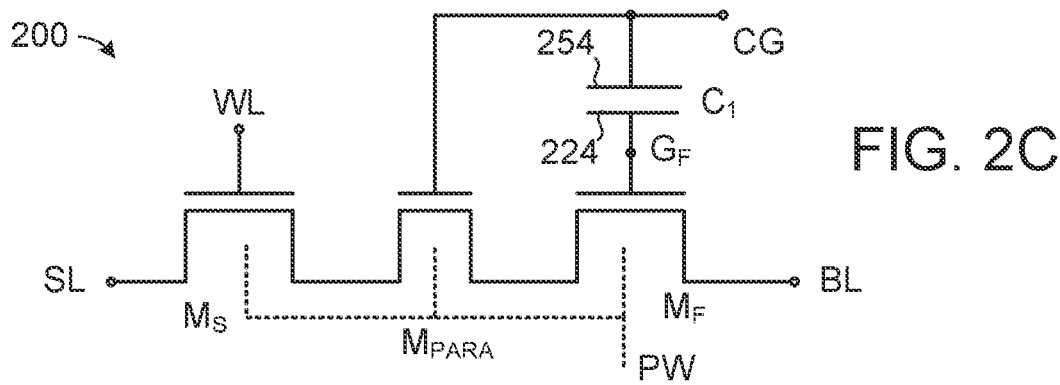
FIG. 2C
| | SL | WL | BL | CG | PW |
|---|---|---|---|---|---|
| PGM | 0V | $V_{ON}$ | $V_{PP}$ | $V_{CGP}$ | 0V |
| ERS | 0V | 0V | $V_{EE}$ | $V_{CGE}$ | 0V |
| Read | 0V | $V_R$ | $V_R$ | $V_{CGR}$ | 0V |
FIG. 3A
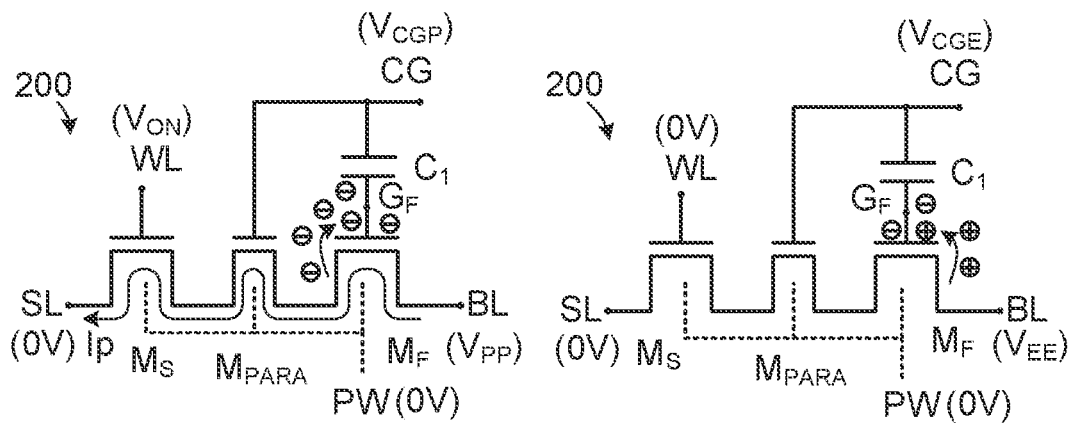
FIG. 3B    FIG. 3C
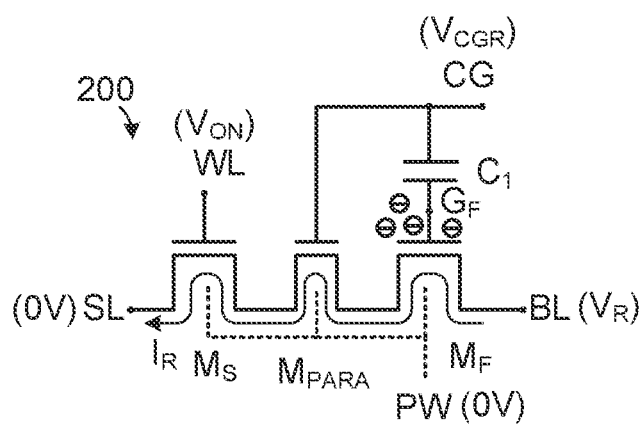
FIG. 3D

ERASABLE PROGRAMMABLE NON-VOLATILE MEMORY CELL

This application claims the benefit of U.S. provisional application Ser. No. 63/329,491, filed Apr. 11, 2022, the subject matter of which is incorporated herein by references.

FIELD OF THE INVENTION

The present invention relates to a non-volatile memory cell, and more particularly to an erasable programmable non-volatile memory cell with N-type transistors.

BACKGROUND OF THE INVENTION

FIG. 1A is a schematic equivalent circuit diagram of a conventional erasable programmable non-volatile memory cell. FIG. 1B is a schematic circuit diagram illustrating the operations of performing a program action on the conventional erasable programmable non-volatile memory cell as shown in FIG. 1A. For brevity, the erasable programmable non-volatile memory cell is also referred hereinafter as a memory cell. As shown in FIGS. 1A and 1B, the conventional memory cell 100 comprises a select transistor $M_S$, a floating gate transistor $M_F$ and an erase capacitor $C_E$. The select transistor $M_S$ and the floating gate transistor $M_F$ are N-type transistors and constructed on a P-well region PW.

The source terminal of the select transistor $M_S$ is connected with a source line SL. The gate terminal of the select transistor $M_S$ is connected with a word line WL. The source terminal of the floating gate transistor $M_F$ is connected with the drain terminal of the select transistor $M_S$. The drain terminal of the floating gate transistor $M_F$ is connected with a bit line BL. The first terminal of the erase capacitor $C_E$ is connected with a floating gate $G_F$ of the floating gate transistor $M_F$. The second terminal of the erase capacitor $C_E$ is connected with an erase line EL.

By providing proper bias voltages to the source line SL, the erase line EL, the bit line BL and the word line WL, a program action, an erase action or a read action can be selectively performed on the memory cell 100.

Please refer to FIG. 1A. Before the program action is performed, no electrons are stored in the floating gate $G_F$ of the floating gate transistor $M_F$. Under this circumstance, the memory cell 100 is in a first storage state.

Please refer to FIG. 1B. When the program action is performed, the source line SL and the P-well region PW receive a ground voltage (0V), the erase line EL and the bit line BL receive a program voltage Vpp, and the word line receives an on voltage Von. Meanwhile, a program current Ip is generated between the bit line BL and the source line SL. When the program current Ip flows through a channel region of the floating gate transistor $M_F$, a channel hot electron injection effect is generated. Due to the channel hot electron injection effect, the hot electrons are injected from the channel region of the floating gate transistor $M_F$ into the floating gate $G_F$ of the floating gate transistor $M_F$. Consequently, the storage state of the memory cell 100 is changed from the first storage state to a second storage state. For example, each of the program voltage Vpp and the on voltage Von is 9.5V.

When the erase action is performed and proper bias voltages are provided, the electrons stored in the floating gate $G_F$ of the floating gate transistor $M_F$ are ejected to the erase line EL through the erase capacitor $C_E$. Consequently, the storage state of the memory cell 100 is changed from the second storage state to the first storage state.

When the program action is performed, the program voltage Vpp is very high. Consequently, the program current Ip generated by the memory cell 100 is very large (e.g., about 400 µA). In addition, the memory cell 100 generates a leakage current LEAK (e.g., about 250 µA) to the P-well region PW. In other words, when the program action is performed, the total current generated by the memory cell 100 is larger than 600 µA. Consequently, the power consumption is high.

Moreover, due to the arrangement of the erase capacitor $C_E$, the induced coupled voltage on the floating gate $G_F$ is low when the program action is performed. Consequently, it is difficult to increase the programming efficiency of the memory cell 100.

SUMMARY OF THE INVENTION

An embodiment of the present invention provides a non-volatile memory cell. The non-volatile memory cell includes a p-type well region, a first n-type doped region, a second n-type doped region, a first gate structure, a second gate structure, a protecting layer, a third gate structure, a source line, a bit line and a word line. The first n-type doped region and the second n-type doped region are formed under a surface of the p-type well region. The first gate structure is formed over the surface of the p-type well region. The first gate structure includes a first gate dielectric layer, a first gate layer and a first spacer. The second gate structure is formed over the surface of the p-type well region. The second gate structure includes a second gate dielectric layer, a second gate layer and a second spacer. The first gate structure and the second gate structure are arranged between the first n-type doped region and the second n-type doped region. A first part of the first gate layer of the first gate structure and the second gate structure are covered by the protecting layer. The third gate structure is formed over the surface of the p-type well region and arranged between the first gate structure and the second gate structure. The third gate structure includes a third dielectric layer and a coupling gate. The source line is electrically connected with the first n-type doped region. The bit line is electrically connected with the second n-type doped region. The word line is electrically connected with a second part of the first gate layer of the first gate structure. The first n-type doped region, the first gate structure and the p-type well region are collaboratively formed as a select transistor. The second n-type doped region, the second gate structure and the p-type well region are collaboratively formed as a floating gate transistor. The third gate structure and the p-type well region are collaboratively formed as a parasitic transistor.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1A (prior art) is a schematic equivalent circuit diagram of a conventional erasable programmable non-volatile memory cell;

FIG. 1B (prior art) is a schematic circuit diagram illustrating the operations of performing a program action on the conventional erasable programmable non-volatile memory cell as shown in FIG. 1A;

FIG. 2A is a schematic top view illustrating a memory cell according to a first embodiment of the present invention;

FIG. 2B is a schematic cross-sectional view illustrating the memory cell according to the first embodiment of the present invention and taken along the dotted line ab;

FIG. 2C is a schematic equivalent circuit diagram of the memory cell according to the first embodiment of the present invention;

FIG. 3A is a bias voltage table illustrating the bias voltages for performing a program action, an erase action and a read action on the memory cell according to the first embodiment of the present invention;

FIG. 3B is a schematic circuit diagram illustrating the operations of performing the program action on the memory cell according to the first embodiment of the present invention;

FIG. 3C is a schematic circuit diagram illustrating the operations of performing the erase action on the memory cell according to the first embodiment of the present invention;

FIG. 3D is a schematic circuit diagram illustrating the operations of performing the read action on the memory cell according to the first embodiment of the present invention;

DETAILED DESCRIPTION OF PREFERRED EMBODIMENTS

Figure 4A:
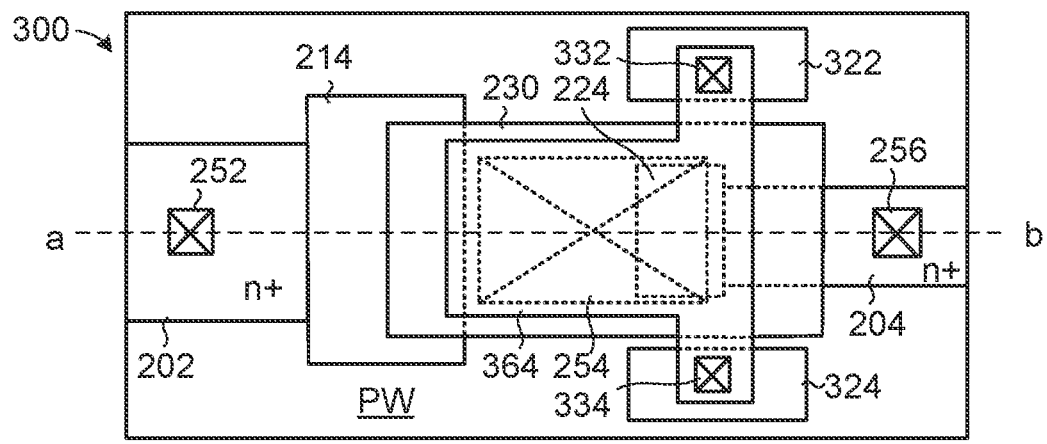
FIG. 4A is a schematic top view illustrating a memory cell according to a second embodiment of the present invention.

FIG. 2A is a schematic top view illustrating a memory cell according to a first embodiment of the present invention. FIG. 2B is a schematic cross-sectional view illustrating the memory cell according to the first embodiment of the present invention and taken along the dotted line ab. FIG. 2C is a schematic equivalent circuit diagram of the memory cell according to the first embodiment of the present invention.

As shown in FIGS. 2A and 2B, a P-well region PW is formed in a semiconductor substrate Sub, and two n-type doped regions (n+) 202 and 204 are formed under the surface of the P-well region PW. Moreover, two gate structures are formed over the surface of the P-well region PW between the n-type doped regions (n+) 202 and 204.

A first side of the first gate structure is located near the n-type doped region (n+) 202. The first gate structure comprises a gate dielectric layer 212, a gate layer 214 and a spacer 216. The gate dielectric layer 212 is formed over the surface of the P-well region PW. The gate layer 214 is formed over the gate dielectric layer 212 to cover the gate dielectric layer 212. The spacer 216 is formed on the sidewalls of the gate dielectric layer 212 and the gate layer 214. A first side of the second gate structure is located near the n-type doped region (n+) 204. A second side of the second gate structure is located near a second side of the first gate structure. The second gate structure comprises a gate dielectric layer 222, a gate layer 224 and the spacer 216. The gate dielectric layer 222 is formed over the surface of the P-well region PW. The gate layer 224 is formed over the gate dielectric layer 222 to cover the gate dielectric layer 222. The spacer 216 is formed on the sidewalls of the gate dielectric layer 222 and the gate layer 224. The gate dielectric layers 212 and 222 are made of silicon dioxide ($SiO_2$). The gate layers 214 and 224 are made of polysilicon. The spacer 216 is made of silicon nitride (SiN) or silicon dioxide ($SiO_2$).

In this embodiment, the position of the first gate structure and the position of the second gate structure are very close. Consequently, the portion of the spacer 216 at the second side of the first gate structure and the portion of the spacer 216 at the second side of the second gate structure are formed on the surface of the P-well region PW and contacted with each other.

Furthermore, a protecting layer 230 is formed over the first gate structure and the second gate structure. A first part of the gate layer 214 of the first gate structure, the portion of the spacer 216 at the second side of the first gate structure and the entire of the second gate structure are covered by the protecting layer 230. Consequently, the gate layer 224 is formed as a floating gate. For example, the protecting layer 230 is a resist protect oxide layer (also referred as a RPO layer) or a salicide block layer (also referred as a SAB layer).

Furthermore, plural silicide layers 232, 234 and 236 are formed. The silicide layer 232 is electrically contacted with the n-type doped region (n+) 202. The silicide layer 236 is electrically contacted with the n-type doped region (n+) 204. The silicide layer 234 is electrically contacted with a second part of the gate layer 214 of the first gate structure. The silicide layer 234 can be used as a word line WL of the memory cell 200.

Furthermore, an inter layer dielectric layer (also referred as an ILD layer) 240 is formed to cover the n-type doped region (n+) 202, the silicide layer 232, the spacer 216, the silicide layer 234, the protecting layer 230, the n-type doped region (n+) 204 and the silicide layer 236.

Furthermore, plural contact holes are formed in the ILD layer 240. A metal conductor line 252 is formed in the contact hole over the silicide layer 232 and electrically contacted with the silicide layer 232. The metal conductor line 252 can be used as a source line SL of the memory cell 200. A metal conductor line 256 is formed in the contact hole over the silicide layer 236 and electrically contacted with the silicide layer 236. The metal conductor line 256 can be used as a bit line BL of the memory cell 200. A metal conductor line 254 is formed in the contact hole over the protecting layer 230 and contacted with the protecting layer 230. The metal conductor line 254 can be used as a coupling gate CG of the memory cell 200.

In accordance with a feature of this embodiment, the opening size of the contact hole over the protecting layer 230 is relatively larger. Moreover, the opening of this contact hole is located over the gate layer 224 of the second gate structure and located over the region of the surface of the P-well region PW between the first gate structure and the second gate structure. Consequently, the coupling gate CG 254 is formed over the gate layer 224 of the second gate structure and formed over the region of the surface of the P-well region PW between the first gate structure and the second gate structure. The coupling gate CG 254 and the gate layer 224 are collaboratively formed as a first capacitor $C_1$. That is, the two terminals of the first capacitor $C_1$ are respectively a polysilicon layer and a metal layer. As a consequently, the first capacitor $C_1$ may be regarded as a poly/metal capacitor.

In the region between the first gate structure and the second gate structure of the memory cell 200, the spacer 216 of the first gate structure and the spacer 216 of the second gate structure are contacted with each other and covered by the protecting layer 230, and the protecting layer 230 is covered by the coupling gate CG 254. In other words, a third gate structure is formed between the first gate structure and the second gate structure. The third gate structure comprises a gate dielectric layer and the coupling gate CG 254. The gate dielectric layer comprises the spacer 216 and the protecting layer 230. In addition, the third gate structure and the P-well region PW are collaboratively formed as a parasitic transistor $M_{PARA}$.

In the subsequent manufacturing process, plural metal layers 262, 264 and 266 are formed over the ILD layer 240. The metal layer 262 is electrically contacted with the metal conductor line 252. The metal layer 264 is electrically contacted with the metal conductor line 254. The metal layer 266 is electrically contacted with the metal conductor line 256.

Please refer to FIG. 2B again. The first gate structure, the n-type doped region (n+) 202 and the P-well region PW are collaboratively formed as a select transistor $M_S$. The second gate structure, the n-type doped region (n+) 204 and the P-well region PW are collaboratively formed as a floating gate transistor $M_F$. The third gate structure and the P-well region PW are collaboratively formed as the parasitic transistor $M_{PARA}$.

Please refer to FIG. 2C. The source terminal of the select transistor $M_S$ is connected with the source line SL. The gate terminal of the select transistor $M_S$ is connected with the word line WL. The source terminal of the parasitic transistor $M_{PARA}$ is connected with drain terminal of the select transistor $M_S$. The gate terminal of the parasitic transistor $M_{PARA}$ is the coupling gate CG. The source terminal of the floating gate transistor $M_F$ is connected with the drain terminal of the parasitic transistor $M_{PARA}$. The drain terminal of the floating gate transistor $M_F$ is connected with the bit line BL. The first terminal of the first capacitor $C_1$ is connected with the gate layer 224 (i.e., the floating gate $G_F$). The second terminal of the first capacitor $C_1$ is connected with the metal conductor line 254 (i.e., the coupling gate CG). The select transistor $M_S$, the parasitic transistor $M_{PARA}$ and the floating gate transistor $M_F$ are N-type transistors and constructed on the P-well region PW.

FIG. 3A is a bias voltage table illustrating the bias voltages for performing a program action, an erase action and a read action on the memory cell according to the first embodiment of the present invention. FIG. 3B is a schematic circuit diagram illustrating the operations of performing the program action on the memory cell according to the first embodiment of the present invention. FIG. 3C is a schematic circuit diagram illustrating the operations of performing the erase action on the memory cell according to the first embodiment of the present invention. FIG. 3D is a schematic circuit diagram illustrating the operations of performing the read action on the memory cell according to the first embodiment of the present invention. When the program action (PGM), the erase action (ERS) and the read action (Read) are performed, the P-well region PW receives a ground voltage (0V).

Please refer to FIGS. 3A and 3B. When the program action (PGM) is performed, the P-well region PW receives the ground voltage (0V), the bit line BL receives a program voltage $V_{PP}$, the source line SL receives the ground voltage (0V), the word line WL receives an on voltage VON, and the coupling gate CG receives a first coupling voltage $V_{CGP}$. Moreover, the magnitude of the first coupling voltage $V_{CGP}$ is higher than the magnitude of the program voltage $V_{PP}$, the magnitude of the on voltage VON is higher than the threshold voltage $V_{TH}$ of the select transistor $M_S$, and the magnitude of the on voltage VON is lower than a half of the program voltage $V_{PP}$ ($V_{PP}/2$). For example, the first coupling voltage $V_{CGP}$ is 9.5V, the program voltage $V_{PP}$ is 8.5V, the threshold voltage $V_{TH}$ of the select transistor $M_S$ is 1V, and the on voltage VON is 4V.

When the program action is performed, the select transistor $M_S$ and the parasitic transistor $M_{PARA}$ are turned on, and a program current $I_P$ is generated between the bit line BL and the source line SL. Consequently, hot electrons are injected from the source side of the floating gate transistor $M_F$ into the floating gate $G_F$ of the floating gate transistor $M_F$. Consequently, the storage state of the memory cell 200 is changed from the first storage state to the second storage state. Moreover, the first coupling voltage $V_{CGP}$ received by the coupling gate CG can be coupled to the floating gate $G_F$ of the floating gate transistor $M_F$. Since the first coupling voltage $V_{CGP}$ is helpful to increase the number of the hot electrons injected into the floating gate $G_F$, the programming efficiency is enhanced.

Please refer to FIGS. 3A and 3C. When the erase action (ERS) is performed, the P-well region PW receives the ground voltage (0V), the source line SL receives the ground voltage (0V), the bit line BL receives an erase voltage $V_{EE}$, the word line WL receives the ground voltage (0V), and the coupling gate CG receives a second coupling voltage $V_{CGE}$. The second coupling voltage $V_{CGE}$ is a negative voltage. The magnitude of the second coupling voltage $V_{CGE}$ is higher than the magnitude of the erase voltage $V_{EE}$. For example, the second coupling voltage $V_{CGE}$ is −10.5V, and the erase voltage $V_{EE}$ is 10V.

Please refer to FIG. 3C again. When the erase action is performed, the select transistor $M_S$ and the parasitic transistor $M_{PARA}$ are turned off. The drain terminal of the floating gate transistor $M_F$ and P-well region PW are reverse biased.

In addition, a depletion region is formed near the junction between the drain terminal of the floating gate transistor $M_F$ and P-well region PW, and a great number of electron-hole pairs are generated in the depletion region. Since the coupling gate CG receives the second coupling voltage $V_{CGE}$ with the negative voltage (e.g., −10.5V), a band-band hot hole injection effect (also referred as a BBHH injection effect) is generated. Due to the BBHH injection effect, the hot holes in the depletion region are injected into the floating gate $G_F$ of the floating gate transistor $M_F$ and recombined with the hot electrons. Consequently, the storage state of the memory cell 200 is changed from the second storage state to the first storage state.

When the erase action is performed, the second coupling voltage $V_{CGE}$ received by the coupling gate CG may be varied according to the practical requirements. For example, the second coupling voltage $V_{CGE}$ in the range between −10.5V and 0V is feasible.

Please refer to FIGS. 3A and 3D. When the read action (Read) is performed, the P-well region PW receives the ground voltage (0V), the source line SL receives the ground voltage (0V), the bit line BL receives a read voltage $V_R$, the word line WL receives the read voltage $V_R$, and the coupling gate CG receives a third coupling voltage $V_{CGR}$. The magnitude of the third coupling voltage $V_{CGR}$ is higher than the magnitude of the read voltage $V_R$. For example, the read voltage $V_R$ is 3V, and the third coupling voltage $V_{CGR}$ is 3.5V.

Please refer to FIG. 3D again. When the read action is performed, the select transistor $M_S$ and the parasitic transistor $M_{PARA}$ are turned on, and a read current $I_R$ is generated between the bit line BL and the source line SL. In the situation of FIG. 3D, hot electrons are stored in the floating gate $G_F$ of the floating gate transistor $M_F$. The floating gate transistor $M_F$ is turned off. The magnitude of the read current IR generated by the memory cell 200 is very low (e.g., nearly zero). Consequently, it is determined that the memory cell 200 is in the second storage state. Whereas, in case that no hot electrons is stored in the floating gate $G_F$ of the floating gate transistor $M_F$, the floating gate transistor $M_F$ is turned on, and the magnitude of the read current IR generated by the memory cell 200 is very high. Under this circumstance, it is determined that the memory cell 200 is in the first storage state. In other words, the storage state of the memory cell 200 can be determined according to the magnitude of the read current IR generated by the memory cell 200.

When the read action is performed, the third coupling voltage $V_{CGR}$ received by the coupling gate CG may be varied according to the practical requirements. For example, the third coupling voltage $V_{CGR}$ in the range between 0V and 4.5V is feasible.

For increasing the voltage couple ratio, the memory cell of the first embodiment may be further modified. For example, at least one additional gate structure is formed beside the second gate structure.

Figure 4B:
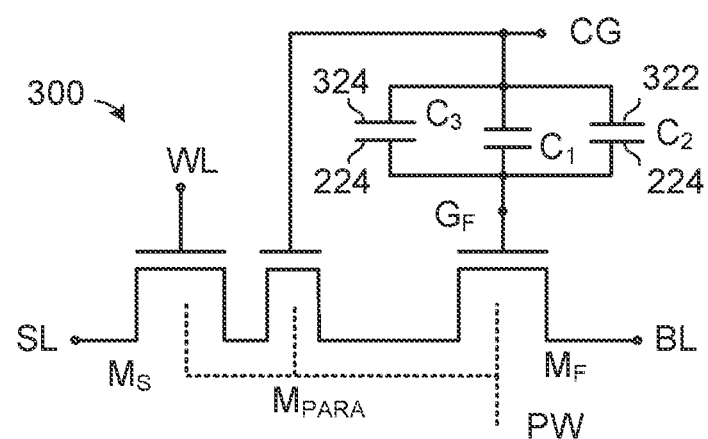
FIG. 4B is a schematic equivalent circuit diagram of the memory cell according to the second embodiment of the present invention.

FIG. 4A is a schematic top view illustrating a memory cell according to a second embodiment of the present invention. FIG. 4B is a schematic equivalent circuit diagram of the memory cell according to the second embodiment of the present invention. The cross-sectional view of the memory cell 300 in the second embodiment and shown in FIG. 4A along the dotted line ab is identical to that of the memory cell shown in FIG. 2B.

In comparison with the top view of the memory cell 200 in the first embodiment, the memory cell 300 in the second embodiment further comprises a fourth gate structure and a fifth gate structure. Moreover, in the memory cell 300, the shape of the metal layer 364 connected with the coupling gate CG is different from the shape of the metal layer 264 of the memory cell 200 in the first embodiment. For brevity, only the distinguished parts between the first embodiment and the second embodiment will be described as follows.

In the second embodiment, the first gate structure, the second gate structure, the third gate structure, the fourth gate structure and the fifth gate structure are simultaneously manufactured, and these gate structures are formed over the surface of the P-well region PW. The fourth gate structure and the fifth gate structure are located at opposite sides of the second gate structure. The fourth gate structure is located beside a third side of the second gate structure. The fifth gate structure is located beside a fourth side of the second gate structure. The fourth gate structure comprises a gate layer 322. The fifth gate structure comprises a gate layer 324. The gate layer 322 of the fourth gate structure and the gate layer 324 of the fifth gate structure are made of polysilicon.

The metal layer 364 is extended to the regions over the fourth gate structure and the fifth gate structure. A metal conductor line 332 is electrically connected with the gate layer 322 and the metal layer 364. A metal conductor line 334 is electrically connected with the gate layer 324 and the metal layer 364. Consequently, a lateral coupled capacitor, i.e., a second capacitor $C_2$, is formed by the gate layer 322 and the gate layer 224 collaboratively. Also, another lateral coupled capacitor, i.e., a third capacitor $C_3$, is formed by the gate layer 324 and the gate layer 224 collaboratively. In other words, the two terminals of the second capacitor $C_2$ are two polysilicon layers, respectively. Consequently, the second capacitor $C_2$ may be referred as a poly/poly capacitor. Similarly, the second capacitor $C_3$ may also be referred as a poly/poly capacitor.

Please refer to the equivalent circuit shown in FIG. 4B. In the memory cell 300 of the second embodiment, the three capacitors $C_1$~$C_3$ are connected between the floating gate $G_F$ of the floating gate transistor $M_F$ and the coupling gate CG in parallel. Consequently, the voltage couple ratio can be effectively increased. It is noted that numerous modifications and alterations may be made while retaining the teachings of the invention. For example, in a variant example of the memory cell 300, the memory cell is equipped with one of the fourth gate structure and the fifth gate structure. In the equivalent circuit, the first capacitor $C_1$ and the second capacitor $C_2$ are connected between the floating gate $G_F$ of the floating gate transistor $M_F$ and the coupling gate CG in parallel, or the first capacitor $C_1$ and the third capacitor $C_3$ are connected between the floating gate $G_F$ of the floating gate transistor $M_F$ and the coupling gate CG in parallel.

Figure 5A:
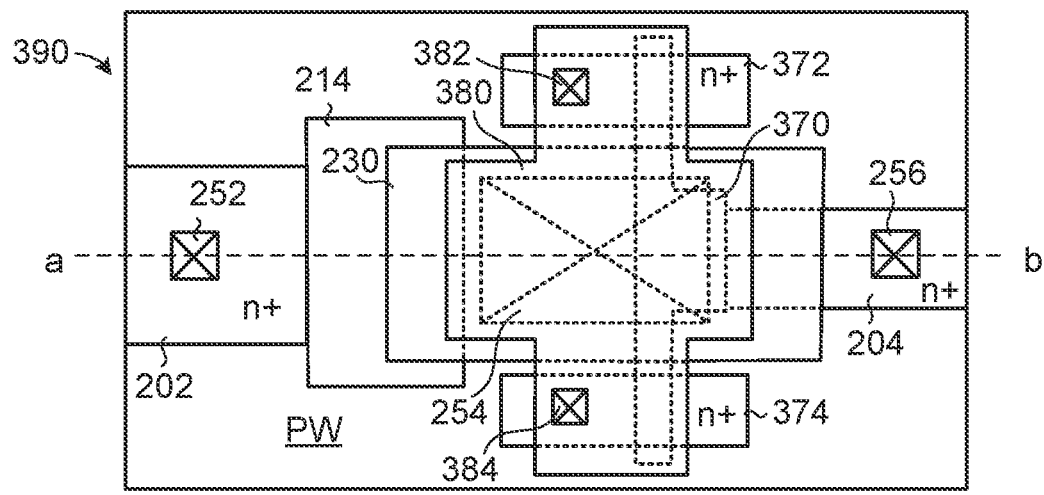
FIG. 5A is a schematic top view illustrating a memory cell according to a third embodiment of the present invention.
Figure 5B:
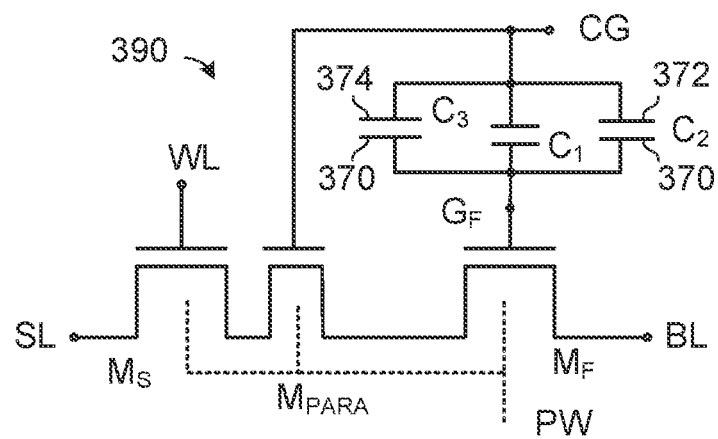
FIG. 5B is a schematic equivalent circuit diagram of the memory cell according to the third embodiment of the present invention.

FIG. 5A is a schematic top view illustrating a memory cell according to a third embodiment of the present invention. FIG. 5B is a schematic equivalent circuit diagram of the memory cell according to the third embodiment of the present invention. The cross-sectional view of the memory cell 390 in the third embodiment and shown in FIG. 5A along the dotted line ab is identical to that of the memory cell shown in FIG. 2B.

In comparison with the top view of the memory cell 200 in the first embodiment, the memory cell 390 in the third embodiment further comprises two n-type doped regions (n+) 372 and 374. Moreover, in the memory cell 390, the shape of the metal layer 380 connected with the coupling gate CG is different from the shape of the metal layer 264 of the memory cell 200 in the first embodiment, and the shape of the second gate structure is different from the shape of the second gate structure of the memory cell 200 in the first embodiment. For brevity, only the distinguished parts between the first embodiment and the third embodiment will be described as follows.

In the third embodiment, the n-type doped regions (n+) 372 and 374 are formed under the surface of the P-well region PW. Moreover, the gate layer 370 of the second gate structure further comprises two extension segments. The two extension segments are extended to the regions over the n-type doped regions (n+) 372 and 374. Moreover, the metal layer 380 is extended to the regions over the n-type doped region (n+) 372 and 374. A metal conductor line 382 is electrically connected with the n-type doped region (n+) 372 and the metal layer 380. A metal conductor line 384 is electrically connected with the n-type doped region (n+) 374 and the metal layer 380.

Under this circumstance, one extension segment of the gate layer 370 and the n-type doped region (n+) 372 are collaboratively formed as a second capacitor $C_2$, and another one extension segment of the gate layer 370 and the n-type doped region (n+) 374 are collaboratively formed as a third capacitor $C_3$. In other words, the two terminals of the second capacitor $C_2$ are respectively a polysilicon layer and a doped region. Consequently, the second capacitor $C_2$ may be referred as a poly/doped-region capacitor. Similarly, the second capacitor $C_3$ may also be referred as a poly/doped-region capacitor.

Please refer to the equivalent circuit shown in FIG. 5B. In the memory cell 390 of the third embodiment, the three capacitors $C_1$~$C_3$ are connected between the floating gate $G_F$ of the floating gate transistor $M_F$ and the coupling gate CG in parallel. Consequently, the voltage couple ratio can be effectively increased. It is noted that numerous modifications and alterations may be made while retaining the teachings of the invention. For example, in a variant example of the memory cell 390, the gate layer 370 is equipped with only one extension segment. In the equivalent circuit, the first capacitor $C_1$ and the second capacitor $C_2$ are connected between the floating gate $G_F$ of the floating gate transistor $M_F$ and the coupling gate CG in parallel, or the first capacitor $C_1$ and the third capacitor $C_3$ are connected between the floating gate $G_F$ of the floating gate transistor $M_F$ and the coupling gate CG in parallel.

The operations of performing the program action (PGM), the erase action (ERS) and the read action (Read) on the memory cell 300 of the second embodiment and the memory cell 390 of the third embodiment are similar to those as shown in FIG. 3A, and not redundantly described herein.

Figure 6A:
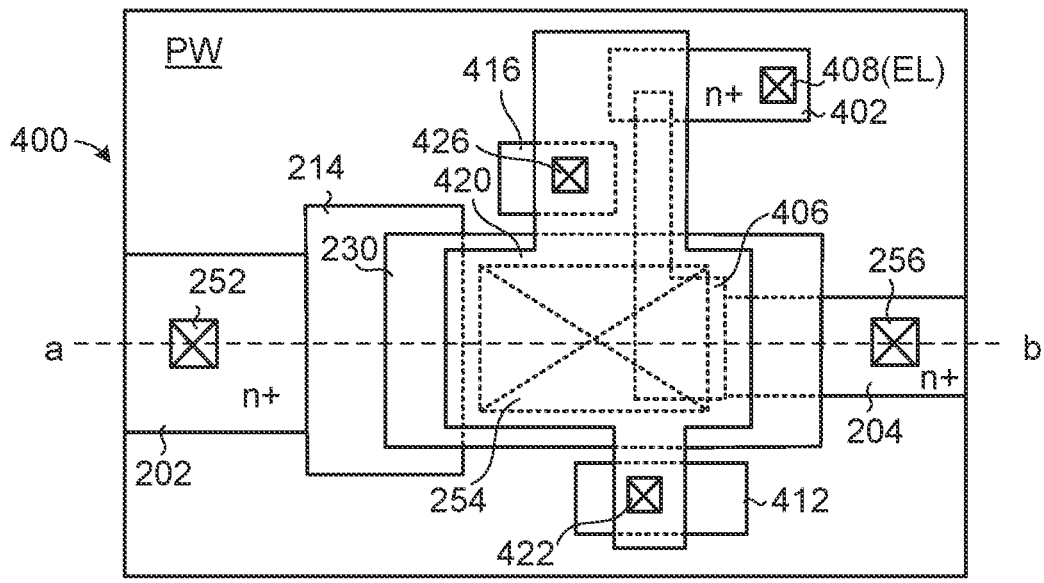
FIG. 6A is a schematic top view illustrating a memory cell according to a fourth embodiment of the present invention.
Figure 6B:
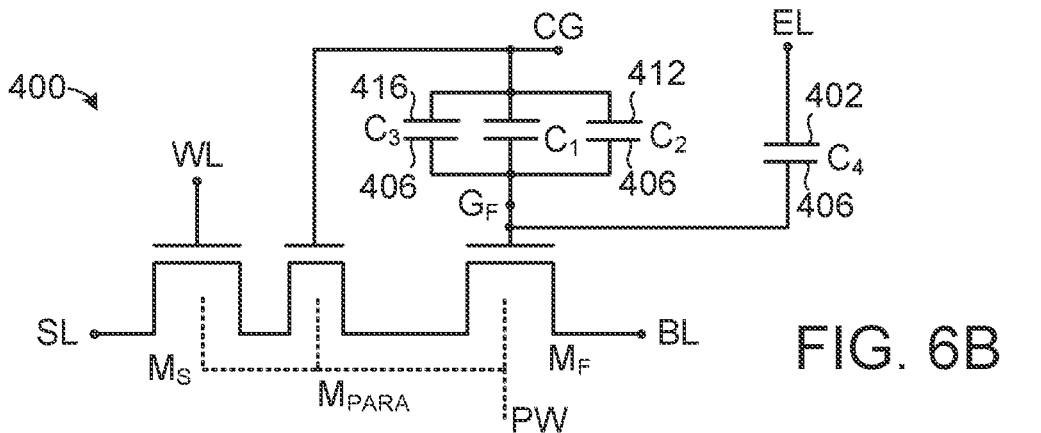
FIG. 6B is a schematic equivalent circuit diagram of the memory cell according to the fourth embodiment of the present invention.

FIG. 6A is a schematic top view illustrating a memory cell according to a fourth embodiment of the present invention. FIG. 6B is a schematic equivalent circuit diagram of the memory cell according to the fourth embodiment of the present invention. The cross-sectional view of the memory cell 490 in the fourth embodiment and shown in FIG. 6A along the dotted line ab is identical to that of the memory cell shown in FIG. 2B.

In comparison with the top view of the memory cell 200 in the first embodiment, the memory cell 400 in the fourth embodiment further comprises a fourth gate structure, a fifth gate structure and an n-type doped region (n+) 402. Moreover, in the memory cell 400, the shape of the metal layer 420 connected with the coupling gate CG is different from the shape of the metal layer 264 of the memory cell 200 in the first embodiment, and the shape of the second gate structure is different from the shape of the second gate structure of the memory cell 200 in the first embodiment. For brevity, only the distinguished parts between the first embodiment and the second embodiment will be described as follows.

In the fourth embodiment, the n-type doped region (n+) 402 is formed under the surface of the P-well region PW. A metal conductor line 408 is electrically connected with the n-type doped region (n+) 402. Moreover, the metal conductor line 408 is used as an erase line EL.

In the fourth embodiment, the first gate structure, the second gate structure, the third gate structure, the fourth gate structure and the fifth gate structure are simultaneously manufactured, and these gate structures are formed over the surface of the P-well region PW. An extension segment of the gate layer 406 of the second gate structure is extended to the region over the n-type doped region (n+) 402. The fourth gate structure is located beside a third side of the second gate structure. The fifth gate structure is located beside the extension segment of the second gate structure. The fourth gate structure comprises a gate layer 412. The fifth gate structure comprises a gate layer 416. The gate layer 412 of the fourth gate structure and the gate layer 416 of the fifth gate structure are made of polysilicon.

The metal layer 420 is extended to the regions over the fourth gate structure and the fifth gate structure. A metal conductor line 422 is electrically connected with the gate layer 412 and the metal layer 420. A metal conductor line 426 is electrically connected with the gate layer 416 and the metal layer 420. Consequently, a lateral coupled capacitor, i.e., a second capacitor $C_2$, is formed by the gate layer 412 and the gate layer 406 collaboratively. Also, another lateral coupled capacitor, i.e., a third capacitor $C_3$, is formed by the gate layer 416 and the gate layer 406 collaboratively. In other words, the two terminals of the second capacitor $C_2$ are two polysilicon layers, respectively. Consequently, the second capacitor $C_2$ may be referred as a poly/poly capacitor. Similarly, the second capacitor $C_3$ may also be referred as a poly/poly capacitor.

Since the extension segment of the gate layer 406 of the second gate structure is extended to the region over the n-type doped region (n+) 402, the gate layer 406 and the n-type doped region (n+) 402 are collaboratively formed as a fourth capacitor $C_4$. Consequently, the fourth capacitor $C_4$ may be referred as a poly/doped-region capacitor.

Please refer to the equivalent circuit shown in FIG. 6B. In the memory cell 400 of the fourth embodiment, the three capacitors $C_1$~$C_3$ are connected between the floating gate $G_F$ of the floating gate transistor $M_F$ and the coupling gate CG in parallel. Consequently, the voltage couple ratio can be effectively increased. Moreover, a capacitor $C_4$ is connected between the erase line EL and the floating gate transistor $M_F$. When the erase action is performed and a proper bias voltage is provided to the erase line EL, a Fowler-Nordheim tunneling effect (also referred as a FN effect) is generated. Due to the FN effect, the hot electrons are ejected from the floating gate $G_F$ of the floating gate transistor $M_F$ to the erase line EL through the fourth capacitor $C_4$.

It is noted that numerous modifications and alterations may be made while retaining the teachings of the invention. For example, in a variant example of the memory cell 400, the memory cell is not equipped with the fourth gate structure and the fifth gate structure. Under this circumstance, only the first capacitor $C_1$ is connected between the floating gate $G_F$ of the floating gate transistor $M_F$ and the coupling gate CG, and the fourth capacitor $C_4$ is connected between the floating gate transistor $M_F$ and the erase line EL.

In another variant example of the memory cell 400, the memory cell is equipped with one of the fourth gate structure and the fifth gate structure. Consequently, in the equivalent circuit, the first capacitor $C_1$ and the second capacitor $C_2$ are connected between the floating gate $G_F$ of the floating gate transistor $M_F$ and the coupling gate CG in parallel, or the first capacitor $C_1$ and the third capacitor $C_3$ are connected between the floating gate $G_F$ of the floating gate transistor $M_F$ and the coupling gate CG in parallel. In addition, the fourth capacitor $C_4$ is connected between the floating gate transistor $M_F$ and the erase line EL.

As mentioned above, in the memory cell 200 of the first embodiment, the third gate structure comprises the coupling gate CG, the protecting layer 230 and the spacer 216. Of course, by simply modifying the third gate structure, some other embodiments of the memory cell can be produced.

Figure 7:
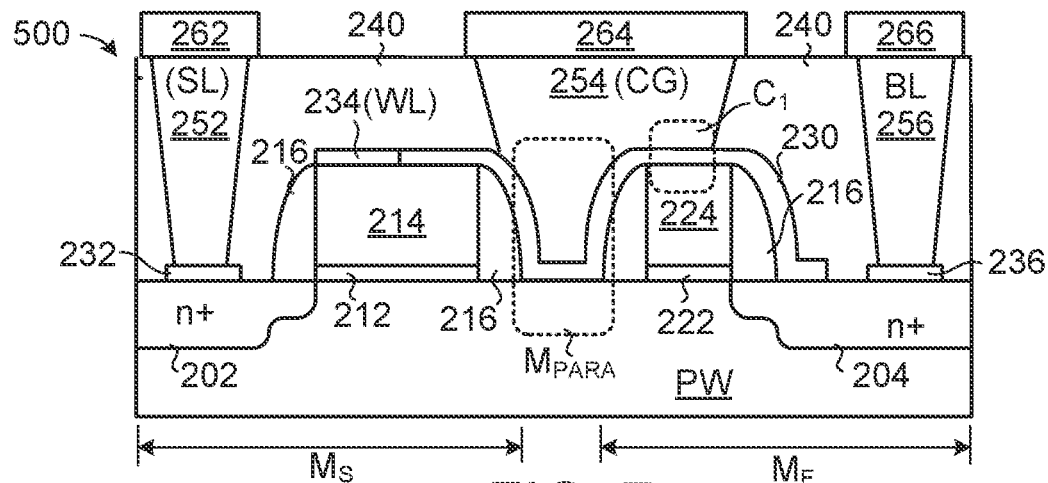
FIG. 7 is a schematic cross-sectional view illustrating a memory cell according to a fifth embodiment of the present invention.

FIG. 7 is a schematic cross-sectional view illustrating a memory cell according to a fifth embodiment of the present invention. In comparison with the memory cell of the first embodiment, the third gate structure of the memory cell 500 in the fifth embodiment comprises the coupling gate CG and the protecting layer 230 only. In this embodiment, during the process of forming the spacer 216, the portion of the space 216 at the second side of the first gate structure and the portion of the spacer 216 at the second side of the second gate structure are not contacted with each other. Consequently, in the subsequent step, the protecting layer 230 is directly contacted with the surface of the P-well region PW. In other words, the gate dielectric layer of the third gate structure comprises the protecting layer 230 only. The coupling gate CG is contacted with the protecting layer 230. The equivalent circuit of the memory cell 500 in the fifth embodiment is similar to the equivalent circuit of the memory cell shown in FIG. 2C, and not redundantly described herein.

Figure 8:
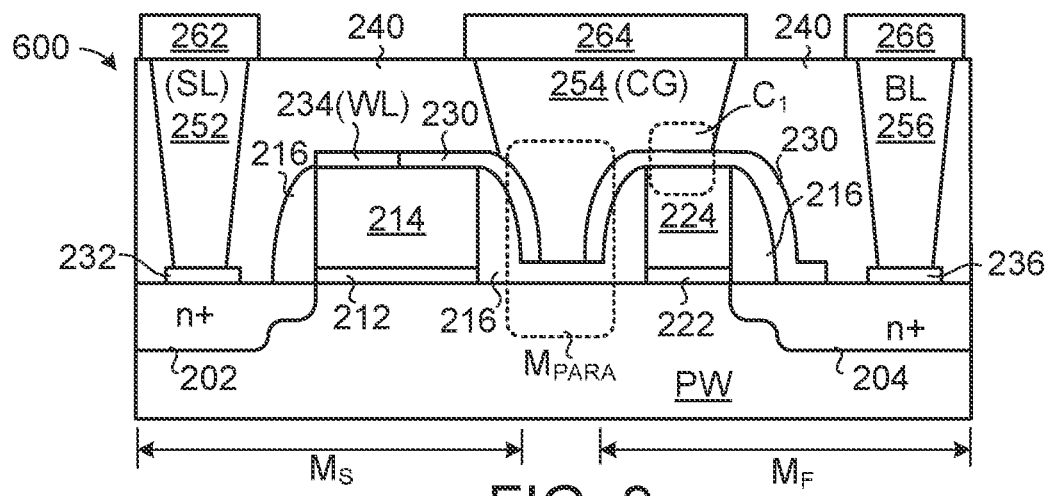
FIG. 8 is a schematic cross-sectional view illustrating a memory cell according to a sixth embodiment of the present invention.

FIG. 8 is a schematic cross-sectional view illustrating a memory cell according to a sixth embodiment of the present invention. In comparison with the memory cell of the first embodiment, the third gate structure of the memory cell 600 in the sixth embodiment comprises the coupling gate CG and the spacer 216 only. In this embodiment, the region between the first gate structure and the second gate structure is not completely covered by the protecting layer 230. In other words, the portion of the spacer 216 between the first gate structure and the second gate structure is exposed. In the subsequent step, the metal conductor line 254 is directly contacted with the spacer 216. In other words, the gate dielectric layer of the third gate structure comprises the spacer 216 only. The coupling gate CG is contacted with the spacer 216. The equivalent circuit of the memory cell 600 in the sixth embodiment is similar to the equivalent circuit of the memory cell shown in FIG. 2C, and not redundantly described herein.

The operations of performing the program action (PGM), the erase action (ERS) and the read action (Read) on the memory cell 500 of the fifth embodiment and the memory cell 600 of the sixth embodiment are similar to those as shown in FIG. 3A, and not redundantly described herein.

Similarly, in the memory cell 300 of the second embodiment, the third gate structure may be modified. In a variant example of the memory cell 300, the third gate structure comprises the coupling gate CG and the protecting layer 230 only. In another variant example of the memory cell 300, the third gate structure comprises the coupling gate CG and the spacer 216 only. The equivalent circuit of the memory cell in each variant example is similar to the equivalent circuit of the memory cell shown in FIG. 4B.

Similarly, in the memory cell 390 of the third embodiment, the third gate structure may be modified. In a variant example of the memory cell 390, the third gate structure comprises the coupling gate CG and the protecting layer 230 only. In another variant example of the memory cell 390, the third gate structure comprises the coupling gate CG and the spacer 216 only. The equivalent circuit of the memory cell in each variant example is similar to the equivalent circuit of the memory cell shown in FIG. 5B.

Similarly, in the memory cell 400 of the fourth embodiment, the third gate structure may be modified. In a variant example of the memory cell 400, the third gate structure comprises the coupling gate CG and the protecting layer 230 only. In another variant example of the memory cell 400, the third gate structure comprises the coupling gate CG and the spacer 216 only. The equivalent circuit of the memory cell in each variant example is similar to the equivalent circuit of the memory cell shown in FIG. 6B.

In some other embodiments, the third gate structure of the memory cell 200 in the first embodiment may be further modified. For example, the coupling gate CG is not located over the gate layer 224.

Figure 9A:
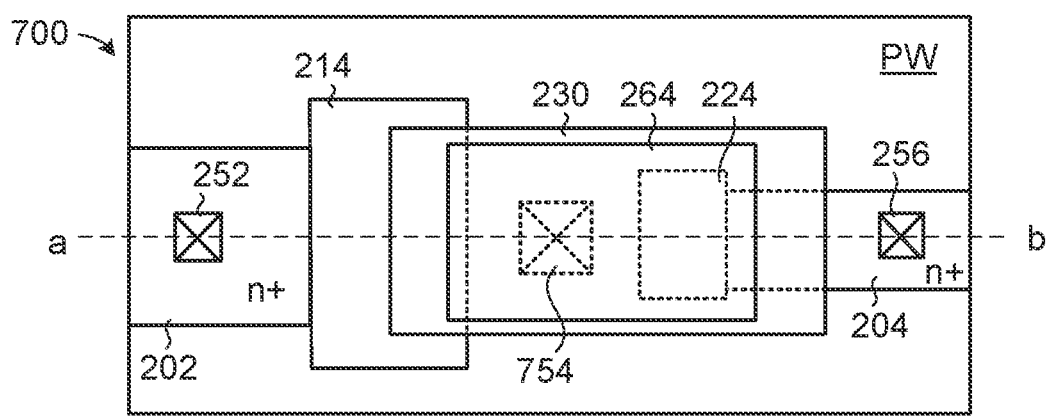
FIG. 9A is a schematic top view illustrating a memory cell according to a seventh embodiment of the present invention.
Figure 9B:
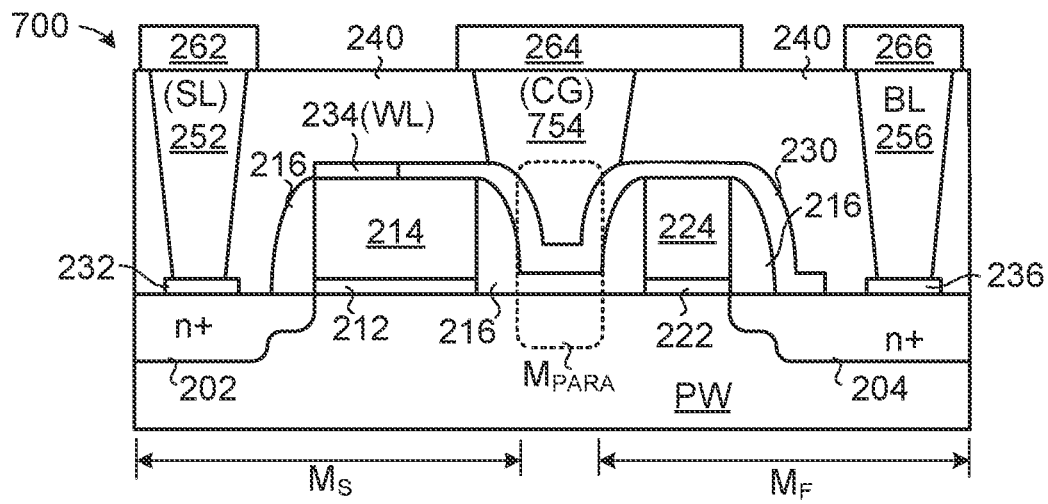
FIG. 9B is a schematic cross-sectional view illustrating the memory cell according to the seventh embodiment of the present invention and taken along the dotted line ab.

FIG. 9A is a schematic top view illustrating a memory cell according to a seventh embodiment of the present invention. FIG. 9B is a schematic cross-sectional view illustrating the memory cell according to the seventh embodiment of the present invention and taken along the dotted line ab.

In this embodiment, the opening size of the contact hole that is formed in the inter layer dielectric layer 240 is for accommodating the metal conductor line 754 is smaller. Consequently, the metal conductor line 754 is not located over the gate layer 224. That is, the gate layer 224 is not covered by the coupling gate CG.

Similarly, the third gate structure in the memory cell 300 of the second embodiment, in the memory cell 390 of the third embodiment or in the memory cell 400 of the fourth embodiment may be modified. Consequently, the gate layer 224 is not covered by the coupling gate CG.

Similarly, in the memory cell 700 of the seventh embodiment, the third gate structure may be further modified. In a variant example of the memory cell 700, the third gate structure comprises the coupling gate CG and the spacer 216 only. In another variant example of the memory cell 700, the third gate structure comprises the coupling gate CG and the protecting layer 230 only.

From above descriptions, the present invention provides an erasable programmable non-volatile memory cell. A first n-type doped region and a second n-type doped region are formed under the surface of the P-well region PW. Moreover, three gate structures are formed on the surface of the P-well region PW between the first n-type doped region and the second n-type doped region. Except for the first n-type doped region and the second n-type doped region, no other n-type doped regions are formed in the P-well region PW under the three gate structures. The first n-type doped region, the first gate structure and the P-well region PW are collaboratively formed as the select transistor. The second n-type doped region, the second gate structure and the P-well region PW are collaboratively formed as the floating gate transistor. The third gate structure and the P-well region PW are collaboratively formed as the parasitic transistor.

Moreover, the third gate layer comprises a gate dielectric layer and a coupling gate. The coupling gate is formed over the second gate structure. Consequently, the coupling gate and the gate layer of the second gate structure are collaboratively formed as a capacitor. In case that more capacitors are formed between the coupling gate and the gate layer of the second gate structure, the voltage couple ratio can be further increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-volatile memory cell, comprising:
   a p-type well region;
   a first n-type doped region and a second n-type doped region formed under a surface of the p-type well region;
   a first gate structure formed over the surface of the p-type well region, wherein the first gate structure comprises a first gate dielectric layer, a first gate layer and a first spacer;
   a second gate structure formed over the surface of the p-type well region, wherein the second gate structure comprises a second gate dielectric layer, a second gate layer and a second spacer, wherein the first gate structure and the second gate structure are arranged between the first n-type doped region and the second n-type doped region;
   a protecting layer, wherein a first part of the first gate layer of the first gate structure and the second gate structure are covered by the protecting layer;
   a third gate structure formed over the surface of the p-type well region, and arranged between the first gate structure and the second gate structure, wherein the third gate structure comprises a third dielectric layer and a coupling gate;
   a source line electrically connected with the first n-type doped region;
   a bit line electrically connected with the second n-type doped region; and
   a word line electrically connected with a second part of the first gate layer of the first gate structure,
   wherein the first n-type doped region, the first gate structure and the p-type well region are collaboratively formed as a select transistor, the second n-type doped region, the second gate structure and the p-type well region are collaboratively formed as a floating gate transistor, and the third gate structure and the p-type well region are collaboratively formed as a parasitic transistor;
   wherein a portion of the protecting layer over the second gate structure is further covered by the coupling gate of the third gate structure, so that the second gate layer and the coupling gate are collaboratively formed as a first capacitor;
   wherein a source terminal of the select transistor is connected with the source line, a gate terminal of the select transistor is connected with the word line, a source terminal of the parasitic transistor is connected with a drain terminal of the select transistor, a gate terminal of the parasitic transistor is the coupling gate, a source terminal of the floating gate transistor is connected with a drain terminal of the parasitic transistor, a drain terminal of the floating gate transistor is connected with the bit line, a first terminal of the first capacitor is connected with a floating gate of the floating gate transistor, and a second terminal of the first capacitor is connected with the coupling gate.

2. The non-volatile memory cell as claimed in claim 1, wherein the first capacitor is a poly/metal capacitor.

3. The non-volatile memory cell as claimed in claim 1, wherein when a program action is performed, the p-type well region receives a ground voltage, the bit line receives a program voltage, the source line receives the ground voltage, the word line receives an on voltage, and the coupling gate receives a first coupling voltage, wherein when the program action is performed, the select transistor and the parasitic transistor are turned on, a program current is generated between the bit line and the source line, so that plural hot electrons are injected from a source side of the floating gate transistor into a floating gate of the floating gate transistor, wherein a magnitude of the first coupling voltage is higher than a magnitude of the program voltage, a magnitude of the on voltage is higher than a threshold voltage of the select transistor, and the magnitude of the on voltage is lower than a half of the program voltage.

4. The non-volatile memory cell as claimed in claim 1, wherein when an erase action is performed, the p-type well region receives a ground voltage, the source line receives the ground voltage, the bit line receives an erase voltage, the word line receives the ground voltage, and the coupling gate receives a first bias voltage, wherein when the erase action is performed, a depletion region is formed near a junction between a drain terminal of the floating gate transistor and the p-type well region, and a band-band hot hole injection effect is generated, so that plural hot holes are injected into a floating gate of the floating gate transistor, wherein the first bias voltage is in a range between the ground voltage and a second coupling voltage, the second coupling voltage is a negative voltage, and a magnitude of the second coupling voltage is higher than a magnitude of the erase voltage.

5. The non-volatile memory cell as claimed in claim 1, wherein when a read action is performed, the p-type well region receives a ground voltage, the source line receives the ground voltage, the bit line receives a read voltage, the word line receives the read voltage, and the coupling gate receives a first bias voltage, wherein when the read action is performed, the select transistor and the parasitic transistor are turned on, and a read current is generated between the bit line and the source line, wherein a magnitude of the first bias voltage is in a range between the ground voltage and the third coupling voltage, and a magnitude of the third coupling voltage is higher than or equal to a magnitude of the read voltage.

6. The non-volatile memory cell as claimed in claim 1, wherein the non-volatile memory cell further comprises a fourth gate structure, wherein the fourth gate structure is formed over the surface of the p-type well region and located beside a first side of the second gate structure, and the fourth gate structure comprises a fourth gate layer, wherein the coupling gate is electrically connected with the fourth gate layer, and the second gate layer and the fourth gate layer are collaboratively formed as a second capacitor.

7. The non-volatile memory cell as claimed in claim 6, wherein the second capacitor is a poly/poly capacitor.

8. The non-volatile memory cell as claimed in claim 6, wherein the non-volatile memory cell further comprises a fifth gate structure, wherein the fifth gate structure is formed over the surface of the p-type well region and located beside a second side of the second gate structure, and the fifth gate structure comprises a fifth gate layer, wherein the coupling gate is electrically connected with the fifth gate layer, and the second gate layer and the fifth gate layer are collaboratively formed as a third capacitor.

9. The non-volatile memory cell as claimed in claim 6, wherein the non-volatile memory cell further comprises a third n-type doped region and an erase line, wherein the third n-type doped region is formed under the surface of the p-type well region, the erase line is electrically connected with the third n-type doped region, and a first segment of the second gate layer of the second gate structure is extended to a region over the third n-type doped region, so that the second gate layer of the second gate structure and the third n-type doped region are collaboratively formed as a third capacitor.

10. The non-volatile memory cell as claimed in claim 9, wherein the third capacitor is a poly/doped-region capacitor.

11. The non-volatile memory cell as claimed in claim 1, wherein the non-volatile memory cell further comprises a third n-type doped region, wherein the third n-type doped region is formed under the surface of the p-type well region, the coupling gate is electrically connected with the third n-type doped region, and a first segment of the second gate layer of the second gate structure is extended to a region over the third n-type doped region, so that the second gate layer of the second gate structure and the third n-type doped region are collaboratively formed as a second capacitor.

12. The non-volatile memory cell as claimed in claim 11, wherein the second capacitor is a poly/doped-region capacitor.

13. The non-volatile memory cell as claimed in claim 11, wherein the non-volatile memory cell further comprises a fourth n-type doped region, wherein the fourth n-type doped region is formed under the surface of the p-type well region, the coupling gate is electrically connected with the fourth n-type doped region, and a second segment of the second gate layer of the second gate structure is extended to a region over the fourth n-type doped region, so that the second gate layer of the second gate structure and the fourth n-type doped region are collaboratively formed as a third capacitor.

14. The non-volatile memory cell as claimed in claim 1, wherein in a region between the first gate structure and the second gate structure, the first spacer of the first gate structure and the second spacer of the second gate structure are contacted with each other and covered by the protecting layer, the protecting layer is covered by the coupling gate, and the first spacer, the second spacer and the protecting layer are collaboratively formed as the third dielectric layer.

15. The non-volatile memory cell as claimed in claim 1, wherein in a region between the first gate structure and the second gate structure, the surface of the p-type well region is covered and contacted with the protecting layer, the protecting layer is covered by the coupling gate, and the protecting layer is the third dielectric layer.

16. The non-volatile memory cell as claimed in claim 1, wherein in a region between the first gate structure and the second gate structure, the first spacer of the first gate structure and the second spacer of the second gate structure are contacted with each other and covered by the coupling gate, and a portion of the protecting layer over the first gate structure and the portion of the protecting layer over the second gate structure are not contacted with each other, and the first spacer and the second spacer are collaboratively formed as the third dielectric layer.

17. The non-volatile memory cell as claimed in claim 1, wherein the non-volatile memory cell further comprises a fourth gate structure, wherein the fourth gate structure is formed over the surface of the p-type well region and located beside a first side of the second gate structure, and the fourth gate structure comprises a fourth gate layer, wherein the coupling gate is electrically connected with the fourth gate layer, and the second gate layer and the fourth gate layer are collaboratively formed as a second capacitor.

18. The non-volatile memory cell as claimed in claim 17, wherein the second capacitor is a poly/poly capacitor.

19. The non-volatile memory cell as claimed in claim 17, wherein the non-volatile memory cell further comprises a fifth gate structure, wherein the fifth gate structure is formed over the surface of the p-type well region and located beside a second side of the second gate structure, and the fifth gate structure comprises a fifth gate layer, wherein the coupling gate is electrically connected with the fifth gate layer, and the second gate layer and the fifth gate layer are collaboratively formed as a third capacitor.

20. The non-volatile memory cell as claimed in claim 17, wherein the non-volatile memory cell further comprises a third n-type doped region and an erase line, wherein the third n-type doped region is formed under the surface of the p-type well region, the erase line is electrically connected with the third n-type doped region, and a first segment of the second gate layer of the second gate structure is extended to a region over the third n-type doped region, so that the second gate layer of the second gate structure and the third n-type doped region are collaboratively formed as a third capacitor.

21. The non-volatile memory cell as claimed in claim 20, wherein the third capacitor is a poly/doped-region capacitor.

22. The non-volatile memory cell as claimed in claim 1, wherein the non-volatile memory cell further comprises a third n-type doped region, wherein the third n-type doped region is formed under the surface of the p-type well region, the coupling gate is electrically connected with the third n-type doped region, and a first segment of the second gate layer of the second gate structure is extended to a region over the third n-type doped region, so that the second gate layer of the second gate structure and the third n-type doped region are collaboratively formed as a second capacitor.

23. The non-volatile memory cell as claimed in claim 22, wherein the second capacitor is a poly/doped-region capacitor.

24. The non-volatile memory cell as claimed in claim 22, wherein the non-volatile memory cell further comprises a fourth n-type doped region, wherein the fourth n-type doped region is formed under the surface of the p-type well region, the coupling gate is electrically connected with the fourth n-type doped region, and a second segment of the second gate layer of the second gate structure is extended to a region over the fourth n-type doped region, so that the second gate layer of the second gate structure and the fourth n-type doped region are collaboratively formed as a third capacitor.

25. A non-volatile memory cell, comprising:
   a p-type well region;
   a first n-type doped region and a second n-type doped region formed under a surface of the p-type well region;
   a first gate structure formed over the surface of the p-type well region, wherein the first gate structure comprises a first gate dielectric layer, a first gate layer and a first spacer;
   a second gate structure formed over the surface of the p-type well region, wherein the second gate structure comprises a second gate dielectric layer, a second gate layer and a second spacer, wherein the first gate structure and the second gate structure are arranged between the first n-type doped region and the second n-type doped region;
   a protecting layer, wherein a first part of the first gate layer of the first gate structure and the second gate structure are covered by the protecting layer;
   a third gate structure formed over the surface of the p-type well region, and arranged between the first gate structure and the second gate structure, wherein the third gate structure comprises a third dielectric layer and a coupling gate;
   a source line electrically connected with the first n-type doped region;
   a bit line electrically connected with the second n-type doped region; and a word line electrically connected with a second part of the first gate layer of the first gate structure, wherein the first n-type doped region, the first gate structure and the p-type well region are collaboratively formed as a select transistor, the second n-type doped region, the second gate structure and the p-type well region are collaboratively formed as a floating gate transistor, and the third gate structure and the p-type well region are collaboratively formed as a parasitic transistor;

wherein in a region between the first gate structure and the second gate structure, the first spacer of the first gate structure and the second spacer of the second gate structure are contacted with each other and covered by the protecting layer, the protecting layer is covered by the coupling gate, and the first spacer, the second spacer and the protecting layer are collaboratively formed as the third dielectric layer.

26. A non-volatile memory cell, comprising:

a p-type well region;

a first n-type doped region and a second n-type doped region formed under a surface of the p-type well region;

a first gate structure formed over the surface of the p-type well region, wherein the first gate structure comprises a first gate dielectric layer, a first gate layer and a first spacer;

a second gate structure formed over the surface of the p-type well region, wherein the second gate structure comprises a second gate dielectric layer, a second gate layer and a second spacer, wherein the first gate structure and the second gate structure are arranged between the first n-type doped region and the second n-type doped region;

a protecting layer, wherein a first part of the first gate layer of the first gate structure and the second gate structure are covered by the protecting layer;

a third gate structure formed over the surface of the p-type well region, and arranged between the first gate structure and the second gate structure, wherein the third gate structure comprises a third dielectric layer and a coupling gate;

a source line electrically connected with the first n-type doped region;

a bit line electrically connected with the second n-type doped region; and a word line electrically connected with a second part of the first gate layer of the first gate structure, wherein the first n-type doped region, the first gate structure and the p-type well region are collaboratively formed as a select transistor, the second n-type doped region, the second gate structure and the p-type well region are collaboratively formed as a floating gate transistor, and the third gate structure and the p-type well region are collaboratively formed as a parasitic transistor;

wherein in a region between the first gate structure and the second gate structure, the surface of the p-type well region is covered and contacted with the protecting layer, the protecting layer is covered by the coupling gate, and the protecting layer is the third dielectric layer.

27. A non-volatile memory cell, comprising:

a p-type well region;

a first n-type doped region and a second n-type doped region formed under a surface of the p-type well region;

a first gate structure formed over the surface of the p-type well region, wherein the first gate structure comprises a first gate dielectric layer, a first gate layer and a first spacer;

a second gate structure formed over the surface of the p-type well region, wherein the second gate structure comprises a second gate dielectric layer, a second gate layer and a second spacer, wherein the first gate structure and the second gate structure are arranged between the first n-type doped region and the second n-type doped region;

a protecting layer, wherein a first part of the first gate layer of the first gate structure and the second gate structure are covered by the protecting layer;

a third gate structure formed over the surface of the p-type well region, and arranged between the first gate structure and the second gate structure, wherein the third gate structure comprises a third dielectric layer and a coupling gate;

a source line electrically connected with the first n-type doped region;

a bit line electrically connected with the second n-type doped region; and a word line electrically connected with a second part of the first gate layer of the first gate structure, wherein the first n-type doped region, the first gate structure and the p-type well region are collaboratively formed as a select transistor, the second n-type doped region, the second gate structure and the p-type well region are collaboratively formed as a floating gate transistor, and the third gate structure and the p-type well region are collaboratively formed as a parasitic transistor;

wherein in a region between the first gate structure and the second gate structure, the first spacer of the first gate structure and the second spacer of the second gate structure are contacted with each other and covered by the coupling gate, and a portion of the protecting layer over the first gate structure and the portion of the protecting layer over the second gate structure are not contacted with each other, and the first spacer and the second spacer are collaboratively formed as the third dielectric layer.

* * * * *